July 25, 1944.   E. R. LOCKWOOD   2,354,214
DIFFERENTIAL GEARING
Filed April 13, 1942   2 Sheets-Sheet 1

Ernest R. Lockwood
INVENTOR.

BY
Victor J. Evans & Co.
ATTORNEYS

July 25, 1944.  E. R. LOCKWOOD  2,354,214
DIFFERENTIAL GEARING
Filed April 13, 1942  2 Sheets-Sheet 2

Ernest R. Lockwood INVENTOR.

BY
Victor J. Evans & Co.

ATTORNEYS

Patented July 25, 1944

2,354,214

UNITED STATES PATENT OFFICE 2,354,214

DIFFERENTIAL GEARING

Ernest R. Lockwood, Joliet, Ill.

Application April 13, 1942, Serial No. 438,833

4 Claims. (Cl. 74—315)

My invention relates to automatic vehicles, and has among its objects and advantages the provision of an improved differential gearing.

An object of my invention is to provide a differential gearing wherein novel means are provided for retarding the compensating action of the gearing so as to provide more efficient traction, as when one wheel is rotating on a slippery surface.

Figure 1:
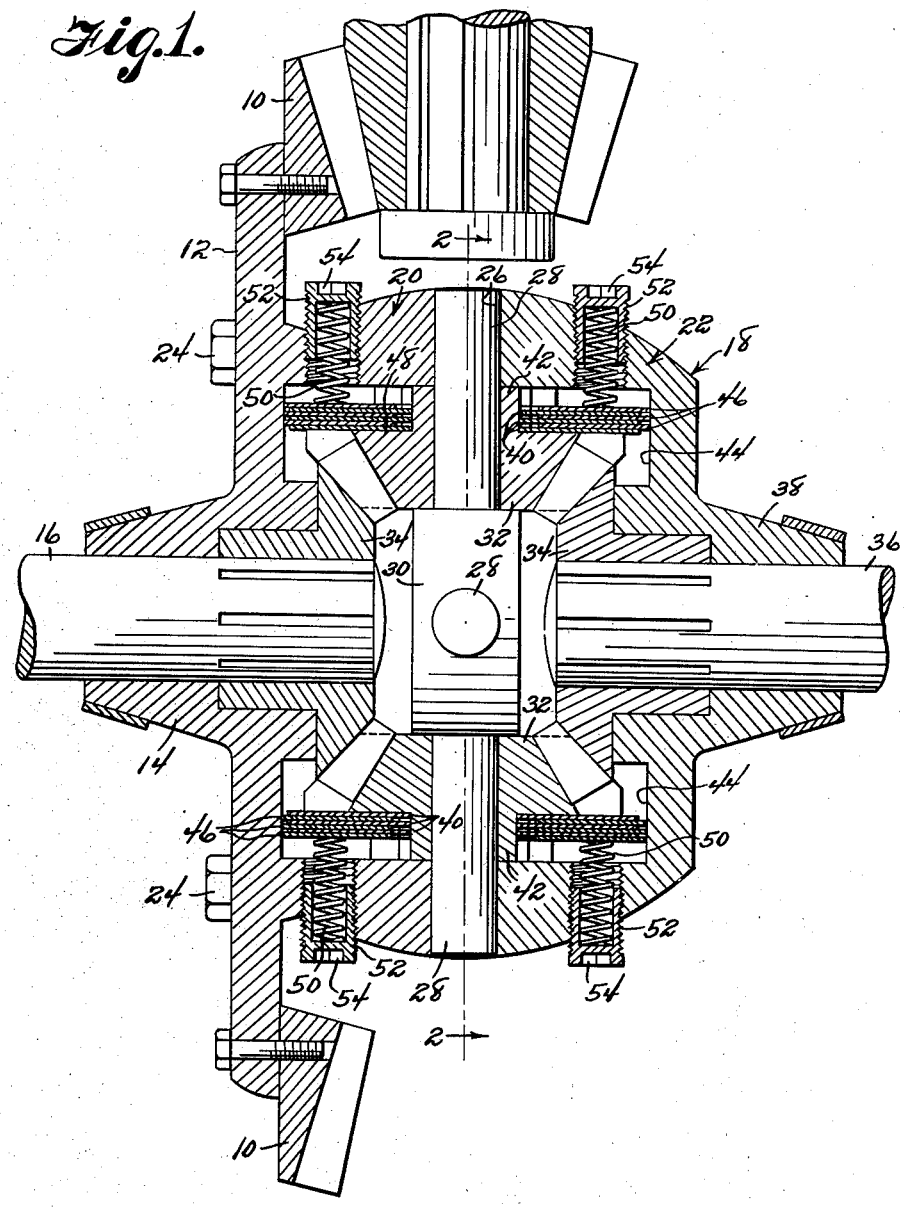
Figure 1 is a sectional view of a differential gearing in accordance with my invention.
Figure 2:
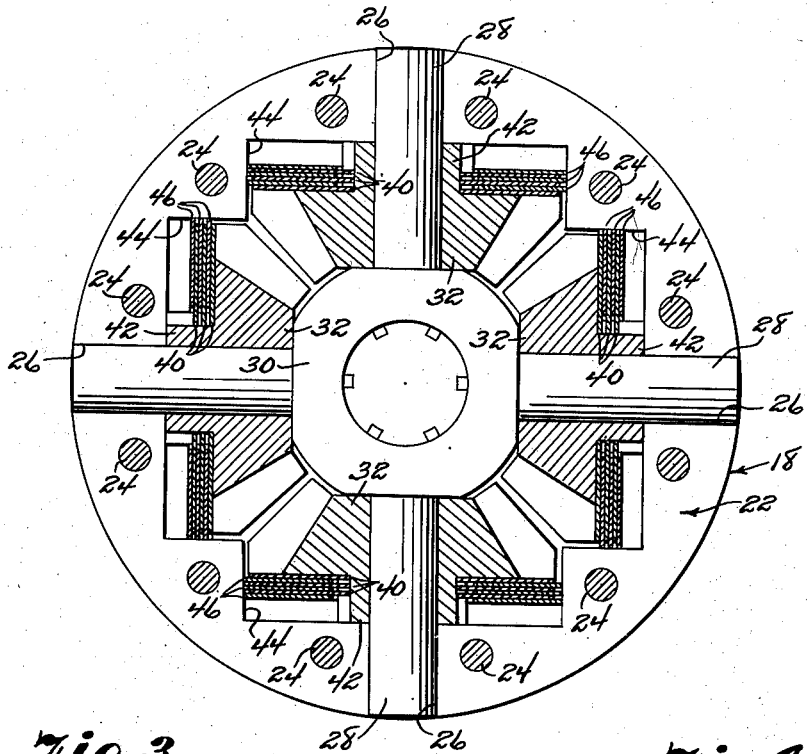
Figure 2 is a sectional view taken substantially along the line 2—2 of Figure 1.
Figure 3:
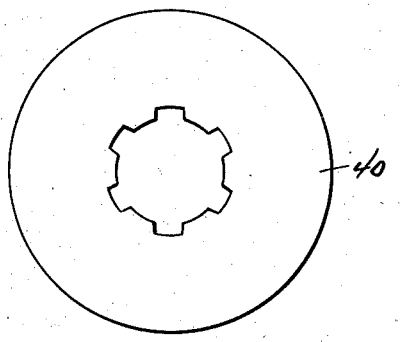
Figure 3 is a plan view of one of the brake or friction disks keyed to a spider gear of the gearing.
Figure 4:
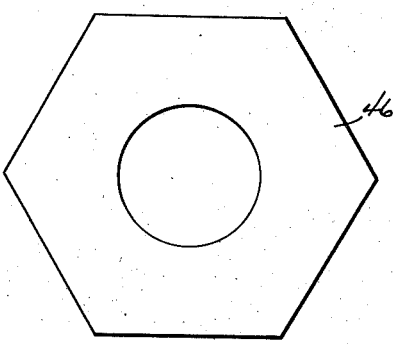
Figure 4 is a plan view of one of the brake or friction disks keyed to the spider housing.

In the embodiment selected for illustration, the differential gearing includes the usual ring gear 10 bolted to a plate 12 having a bearing 14 for one axle shaft 16 connected with the rear drive wheel in the usual manner. To the plate 12 is secured the spider housing 18, which housing comprises a section 20 cast integrally with the plate 12 and a section 22 secured to the section 20 by bolts 24. The sections 20 and 22 are recessed at 26 to provide accommodation for the four spider shafts 28 interconnected by a hub structure 30. Thus the sections 20 and 22 divide in a plane corresponding to the axes of the spider shafts 28.

Upon the spider shafts 28 are rotatably mounted spider gears 32 meshing with bevel gears 34 respectively keyed to the axle shaft 16 and the second axle shaft 36 connected with the other drive wheel of the vehicle in the usual manner. Section 22 is provided with a bearing 38 for the axle shaft 36.

A plurality of friction or braking disks 40 has a splined connection with each hub 42 of the respective spider gears 32. Thus the disks 40 are connected for rotation with their respective spider gears but are loosely connected for movement longitudinally of the hubs. The sections 20 and 22 are internally shaped to provide hexagonally shaped openings 44 having engagement with friction or braking disks 46 of corresponding contour. A plurality of disks 46 is associated with each group of disks 40. The disks 46 are alternately positioned between the disks 40. While the disks 46 are restrained from relative rotation inside the openings 44, the disks are free to move longitudinally of their respective spider gear hubs 42 in the same manner as their respective disks 40.

The spider gears 32 are provided with rear faces 48 against which the group disks 40 and 46 are pressed by reason of compression springs 50.

The compression springs are housed in tubular members 52 threaded into the respective sections 20 and 22. Recessed nuts 54 are provided at the outer ends of the members 52 to facilitate rotation thereof. The tension of the springs 50 may be varied through adjustment of the members 52 so as to increase or decrease the frictional relationship between the two sets of disks in each group on the spider gears.

The present invention is effective in braking the drive wheels against objectionable spinning so as to secure better traction under slippery road conditions. In addition, the device is of relatively simple and durable construction, and one in which the two sets of friction disks are easily and quickly assembled, as well as supported against relative rotation with respect to the spider gear hubs and the spider housing. The frictional relationship may be easily and quickly adjusted through adjustment of the members 52.

Without further elaboration, the foregoing will so fully illustrate my invention, that others may, by applying current knowledge, readily adapt the same for use under various conditions of service.

I claim:

1. Restraining means for differential gearing having a plurality of spider gears rotatably mounted in a housing in engagement with gears fixed on axle shafts extending into the housing, comprising a first set of friction members fixed to each spider gear and disposed concentrically of its axis, a second set of friction members arranged in alternate face to face assembly with said first set and having non-rotary engagement with the housing, and a plurality of springs mounted in the housing perpendicularly to and bearing against said friction members to resiliently maintain the respective members in frictional engagement to restrain rotation of said spider gears.

2. The invention described in claim 1 wherein said second set of friction members are of non-circular contour and engage correspondingly shaped recesses in the housing and wherein means are provided for adjusting the pressure of said springs against the friction members.

3. The invention described in claim 1 wherein said housing is provided with interiorly threaded bores in its circumferential wall parallel with the axis of each spider gear, a tubular member threaded in each of said bores and housing a coil compression spring bearing against the friction members.

4. The invention described in claim 1 wherein each spider gear has a splined hub portion at its outer end and said first set of friction members are in the form of disks having central notched apertures fitted on said splined hub.

ERNEST R. LOCKWOOD.

CERTIFICATE OF CORRECTION.

Patent No. 2,354,214. July 25, 1944.

ERNEST R. LOCKWOOD.

It is hereby certified that error appears in the printed specification of the above numbered patent requiring correction as follows: Page 1, first column, line 1, for the word "automatic" read --automotive--; and that the said Letters Patent should be read with this correction therein that the same may conform to the record of the case in the Patent Office.

Signed and sealed this 14th day of November, A. D. 1944.

Leslie Frazer (Seal)                 Acting Commissioner of Patents.